March 2, 1954
H. KÖLBEL ET AL
2,671,103
CATALYTIC HYDROGENATION OF CARBON MONOXIDE
IN LIQUID SUSPENSIONS OF CATALYST
Filed May 12, 1950
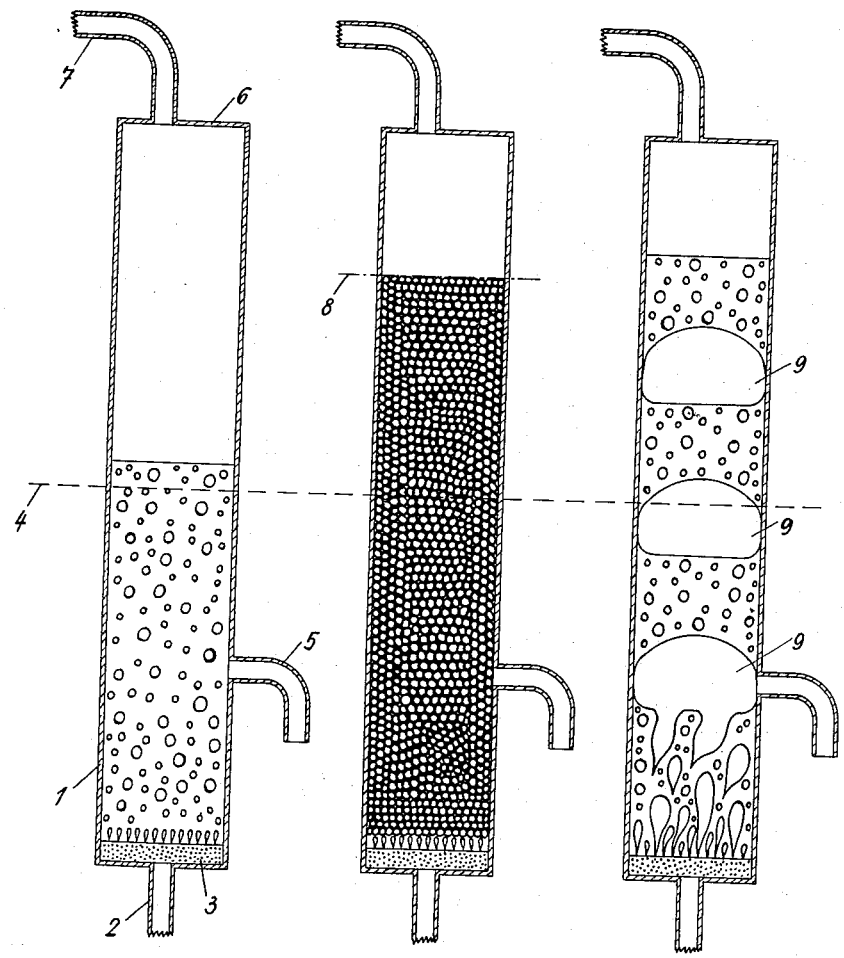
INVENTORS
HERBERT KÖLBEL
BY PAUL ACKERMANN
att'ys Patented Mar. 2, 1954

UNITED STATES PATENT OFFICE 2,671,103

2,671,103

CATALYTIC HYDROGENATION OF CARBON MONOXIDE IN LIQUID SUSPENSIONS OF CATALYST

Herbert Kölbel, Homberg (Niederrhein), Kreis Moers, and Paul Ackermann, Moers, Kreis Moers, Germany, assignors to Rheinpreussen Aktiengesellschaft für Bergbau und Chemie, Homberg (Niederrhein), Germany, a German corporation Application May 12, 1950, Serial No. 161,622

Claims priority, application Germany October 28, 1949

16 Claims. (Cl. 260—449.6)

This invention relates to new and useful improvements in the catalytic hydrogenation of carbon monoxide in liquid suspensions of catalyst.

In the hydrogenation of carbon monoxide a mixture of carbon monoxide and hydrogen conventionally termed synthesis gas is brought into contact with a suitable catalyst and is reacted to form aliphatic hydrocarbons of both the saturated and unsaturated type and also oxygenated derivatives thereof. This synthesis has become generically known as the Fischer-Tropsch synthesis and the general conditions of pressure, temperatures, type and composition of catalyst and of catalyst additives essential for such synthesis are well known and established in the art.

When using a dry catalyst and particularly when fluidizing the same, i. e., floating finely divided catalyst (usually countercurrent) in the synthesis gas within the synthesis reactor, the heat evolved by the exothermic nature of the conversion may cause a runaway reaction leading to difficultly controllable increases in temperatures beyond those desirable for satisfactory yields. For the purpose of furnishing better controllable conditions for the Fischer-Tropsch type synthesis, the proposal has been made to suspend finely divided catalyst material in a liquid medium and preferably a hydrocarbon mixture such as may be, for instance, obtained by way of the higher boiling components of the synthesis products. This suspension can then be subjected to cooling to continuously remove therefrom excess heat. One of the disadvantages of this proposal, however, is that it permits only a relatively low hourly through-put of synthesis gas. Thus, for instance, a catalyst oil suspension (hydrocarbon fraction boiling between about 250 and 300° C.) containing from 10-50% by weight of base metal such as iron in the catalyst is only capable of utilizing an hourly through-put of synthesis gas of from about 10-100 Ncbm per cubic meter of the catalyst oil suspension. With this relatively low through-put of gas, the reactor is not used to full capacity, as the maximum yield of synthesis products obtained in a twenty-four hour period is only 400 kilograms per cubic meter of reactor.

One object of the invention is an improved process for the catalytic hydrogenation of carbon monoxide utilizing finely divided catalyst in liquid suspension.

Another object of the invention is a high yield process for the catalytic hydrogenation of carbon monoxide utilizing a catalyst suspension and preferably an iron catalyst suspension in a hydrocarbon oil material.

The foregoing and still further objects of the invention will be apparent from the following description:

We have discovered that when maintaining certain critical conditions in a catalytic hydrogenation of carbon monoxide in the presence of oil suspended catalysts and preferably iron type catalysts, considerable increases in yield per unit of time and volume of reactor can be obtained, while at the same time appreciably increasing the yield of the more valuable or more readily marketable products of the synthesis, both on the basis of volume of synthesis gas put through the reactor as well as per weight unit of catalyst employed.

Within the broad concept of the invention, synthesis gas is continuously passed into a hydrocarbon suspension of a carbon monoxide hydrogenation catalyst having a concentration in the order of magnitude of from 50-500 gram catalyst per liter suspension, and a catalyst particle size in the order of magnitude of from 0.002-1.0 mm., at a rate of gas flow, expressed in N liters (N liter=1 liter at 760 mm. mercury pressure and 0° C.) per hour per liter of catalyst suspension, equivalent to about 10-30 times the per cent weight of catalyst base metal in the said suspension. The catalyst suspension of the above concentration and particle size of catalyst into which the synthesis gas is passed at the above-stated rate of flow is maintained under a pressure of the order of magnitude of from 3-150 atmospheres (above atmospheric) whereby within these limits the amount of the applied pressure is adapted to the rate of flow of the synthesis feed gas in such a manner that the rate of flow of the compressed synthesis feed gas is substantially maintained at a value per hour of an order of magnitude of from 5-100 liters gas under the applied pressure per liter of catalyst suspension.

When proceeding in accordance with the invention and within the limits hereinabove stated, an intimate mixture of synthesis gas and catalyst suspension is obtained having a substantially constant volume of about 40-100 per cent higher than the volume of the suspension itself and substantially independent of variations in the rate of flow of synthesis gas provided the same is maintained within the broad limits above specified. Under these conditions, the two phases of oil and gas will form a substantially stable system of exceptionally homogeneous mixture as illustrated in Fig. 1b. With a lower through-put of gas than that provided in accordance with the invention (Fig. 1a), the individual gas bubbles will move up the liquid column separately and at different speeds. Their speed in this case is governed by such factors as bubble size, differentials between liquid and gas densities, viscosity, and surface tension of the liquid. The system gas-liquid will then contain a maximum of nearly 10% by volume of gas. As soon as a further increase in gas through-put, however, reaches or exceeds the minimum gas through-put above defined in accordance with the invention, the volume of the system gas-liquid will suddenly expand by at least 40–70% and in many cases by 100% and remain constant even if gas through-put is further increased (Fig. 1b). The following observation is then made: the gas bubbles are all quite uniform in size, separated only by thin layers or films of liquid and the speed of their vertical movement is only a fraction of the speed of the vertical movement of gas bubbles of equal size in System (1a). The bubbles of System (1b), however, are at the same time vigorously torn about in a more horizontal direction. In this state of expanded volume in accordance with the invention, 35–50% of the volume of the system gas-liquid consist of gas bubbles. The catalyst suspension in effect then floats as a fine dispersion in between the gas bubbles.

The effect produced by this condition on the hydrogenation of carbon monoxide is quite surprising. Its most conspicuous feature is that, starting with low gas through-puts, the conversion of CO is only moderate at first, until the critical minimum gas through-put is reached or exceeded, at which point the conversion will suddenly rise to nearly 100% and keep on this level although the other conditions remain constant and even though gas through-put is further increased to a multiple of its original value. It is to be noted that the state or physical characteristics of the expanded volume gas-liquid suspension are distinctly different from those of a froth state. In the former the shape of the gas bubbles is still almost spherical, resulting in an irregular thickness of the liquid layers or film between the gas bubbles, and the two phases of gas-liquid are in relative movement to each other. In a froth, on the other hand, the gas bubbles are forced into polyhedrons and are separated by liquid layers or films of substantially uniform thickness which move together with the gas bubbles in the same direction.

If gas through-put is increased in excess of the limits stipulated in the invention, the system gas-liquid suspension is gradually destroyed as a growing number of gas bubbles will join and rapidly break through to the top (bubbling) (Fig. 1c), resulting in stratification of gas and liquid. Gas conversion will then suddenly drop back.

While the invention insures complete conversion of gas independent of synthesis pressure and catalyst concentration, the use of the higher range of catalyst concentrations is coupled according to the invention with increased gas through-put and will allow, particularly when using increased synthesis pressure, an appreciable increase in the time unit yield per cubic meter of reactor which may reach up to 4000 kg. of synthesis products in twenty-four hours.

The benefits obtained on the basis of prolonged activity of catalyst and high yields per unit base metal in the catalyst is for instance demonstrated by the fact that one ton of iron in the catalyst will yield an average of 700 tons of synthesis products during the whole period of catalyst service of about 90 days.

Though attempts have been made at various times of checking the formation of methane in the hydrogenation of carbon monoxide such as by using constant low synthesis temperatures, no carbon monoxide hydrogenation process has as yet become known which successfully solves this problem. Previously known methods of synthesis and particularly those conducted under conditions seeking relatively high outputs produce methane in considerable quantities. This, however, is not the case in the process in accordance with the instant invention in which no appreciable formation of methane takes place. This effect is particularly new and unexpected inasmuch as the many unsuccessful attempts made to control the undesirably high formation of methane as part of the synthesis process have led to the general assumption that the formation of large amounts of methane is an unavoidable evil.

One of the advantages of the process in accordance with the invention is the fact that the same permits the utilization of higher synthesis temperatures than are normally possible within the limits required for relatively high output yields. Ordinarily, temperatures above approximately 250° C. favor the production of methane and the separation of carbon, thereby resulting in poorer yields, and it is necessary that, in order to maintain a fair equilibrium in favor of the higher molecular hydrocarbons or hydrocarbon derivatives, fairly low temperatures be ordinarily used.

When proceeding in accordance with the invention, however, no such limitations exist, and the reaction temperature may be generally kept at least 10–70 degrees higher than is normally considered a safe upper limit for complete gas conversion with a minimum of undesirable by-products. The upper limit of the temperature is solely governed by the requirement that the particular hydrocarbon or oil used for the suspension is not deleteriously affected by cracking reactions, and ordinarily a temperature of 360° C. constitutes the limit beyond which danger of cracking may be present. For best results, we find it of advantage to use average synthesis temperatures between 200 and 360° C., and preferably between 220 and 320° C. It is thus possible by utilizing higher synthesis temperatures to take advantage of increased reaction speeds and to thereby favor the formation of predominantly low molecular, largely unsaturated and more heavily isomerized hydrocarbons and without excessive formation of methane or appreciable deposition of carbon thereby making available practically the entire yield in the form of desirable products. Thus the ultimate output of synthesis products per unit volume of synthesis gas used is still further increased.

The drawings show a cross-sectional representation of a typical reactor useful in accordance with the invention, the only difference between Figs. 1a, 1b, and 1c being the differences in the two phase liquid-gas system hereinabove referred to, with Fig. 1a showing less than the critical limitations for gas through-put in accordance with the invention, Fig. 1c an excess of those critical limitations, and Fig. 1b an illustration of the two phase system when operating within these limitations. The reactor as shown comprises the outer cylindrical wall 1 enclosing the reaction zone which is charged with the catalyst suspension. Gas inlet duct 2 is provided at the bottom of the reactor and passes the synthesis gas to and through a distributor 3 preferably composed of a porous filter such as ceramic material. The reactor carries the tail gas or exit duct 7 in cover 6 and is further provided with a withdrawal duct 5. Suitable conventional temperature maintaining arrangement (not shown) may be provided by a double mantle through which a suitable heat exchange liquid is passed which, as is well understood in the art, may serve either as a heating medium or as a cooling medium as the particular conditions of the reactor may require at any given time. When the synthesis gas is introduced into the reactor through duct 2, it will become distributed being dispersed into the liquid by way of the porous bed or filter member 3. The dotted line designated as 4 indicates the normal liquid level of the catalyst suspension without gas being introduced into the reactor. Line 8 indicates the level of the suspension-gas phases when operating within the critical limits of the invention. The large bubbles showing a breakdown of the homogeneous gas-suspension phase are indicated as such in Fig. 1c. It is understood that in all cases where the reactor is to operate under a positive synthesis pressure, suitable conventional arrangements for the maintaining of such pressure (not shown) are included.

The synthesis gas usable in accordance with the invention is the conventional gas mixture generally applicable to the synthesis of hydrocarbon products in accordance with a carbon monoxide hydrogenation procedure of the Fischer-Tropsch type. Such synthesis gas may include a gas product obtained for instance also by a typical water-gas reaction or may have been generated in any other suitable manner well known in the art for this type of reaction. The oil used for the suspension of the catalyst is preferably a hydrocarbon oil product of a boiling range which, under the conditions of temperature and pressure at which the particular carbon monoxide hydrogenation is to proceed, will not appreciably volatilize. Thus, for instance, I prefer to use a hydrocarbon oil product fraction having a boiling point generally somewhat higher than the highest reaction temperature that is to be used in the synthesis. Within the general scope of invention, hydrocarbon product oil fractions boiling between 250 and 360° C. are normally satisfactory. Within the preferred embodiment of the invention, however, I find it of advantage to use for the suspension of the catalyst an oil product as it is obtained in the synthesis itself and having the requisite boiling range.

The catalyst useful in accordance with the invention may be any suitable catalyst conventionally employed for carbon monoxide hydrogenation in accordance with the Fischer-Tropsch type synthesis. Such catalysts contain, as it is known, metals of the 8th group of the periodic system of the elements, like iron, nickel, cobalt or ruthenium. In accordance with the preferred embodiment, however, it is preferred to use an iron catalyst. Iron type catalysts, as is well known, may be, for instance, obtained from ferric oxides obtained or processed from other types of iron compounds such as iron salts under particularly careful manufacturing conditions in accordance with well known practice. Such type iron catalysts obtained from ferric oxides are of exceptionally high activity. As is well known, the catalytic material is first introduced into the reaction zone in the form of the metal oxide or other reducible metal compound and is then subjected to a reducing reaction. This may be done either in the dry state or preferably by suspending the oxidic or other reducible catalyst material in the oil to be used as a carrier and subjecting the material therein to a reducing reaction such as for instance to the action of a synthesis gas to thereby convert the catalytic material into its active form. Active ferric oxide catalyst materials have the advantage that the active catalytic material obtained therefrom will catalyze carbon monoxide hydrogenation to hydrocarbons even at comparatively low temperatures. However, in order to produce low boiling synthesis products that are rich in olefines and isohydrocarbons, the process in accordance with the invention may utilize higher temperatures of the 280 to 320° C. range. Catalysts especially suited to synthesis at such increased temperatures on account of their relatively low sensibility to such temperatures are, for instance, represented by the following technical raw materials: hammer scales, residues of ferric oxide derived from the alkaline disintegration of bauxite, iron powder and iron filings. Natural iron compounds, i. e., compounds of mineral origin that may be used for catalytic purposes in accordance with the invention, may also include magnetic iron ore, red (oligiste) iron ore, brown iron ore (limonite), needle iron ore, goethite, ruby iron mica, bog-ore, iron spar, and similar type materials.

To the extent that the catalysts employed for the synthesis in liquid medium in accordance with the invention are completely free from activators or practically consist of metals of the 8th group of the periodic system or their compounds only, it is desirable in accordance with the practice of our invention to add suitable activating substances conventionally known and used for synthesis of the Fischer-Tropsch type. Employing iron catalysts, the quantity of these, however, should not exceed 1% by weight of the iron contained in the catalyst. Copper, for example, is such activating additive. Cobalt or nickel catalysts may be activated by addition of Th, Mg or Cu or their compounds in quantities of not more than a few per cent of the catalyst basic metal contained in the catalyst. For a further increase in activity, alkali compounds may be added to the catalysts, governed by the desired quality of the synthesis products.

A preferred conversion proceeding in accordance with our invention, of the aforenamed oxidic catalyst materials, especially oxidic iron catalyst material into its active form, comprises its treatment in particled subdivision (preferably ball mill ground) in the hydrogenation reactor in the presence of oil and preferably as an oil dispersion in suspension at temperatures about 10–50° C. in excess of those applied in the subsequent synthesis, with carbon monoxide or gases principally containing carbon monoxide, under pressures of 1–10 atm. in excess of atmospheric pressure and preferably 2 atm. in excess of atmospheric pressure, employing an hourly rate of gas flow within the reactor of more than 100 Ncbm of gas per cubic meter of catalyst suspension. With this kind of treatment, high activity and a fine, uniform dispersion of the catalyst owing to particle bursting is reached. If iron catalysts of low temperature sensibility are used, it is not necessary to increase the conversion temperature above the temperature of the subsequent synthesis in the designated degree. In consequence of the higher reaction temperatures of these particular iron catalysts the conversion with carbon monoxide can already be operated at the same temperatures as those of the reaction.

By way of alternative procedure for the conversion of oxidic catalyst material into its active form, a dry process may be used. In this case the particled material and preferably ball mill ground material in dry form is subjected to a suitable reducing agent. This may be accomplished in a reactor type chamber, it being desirable, however, in this case to use a synthesis type gas mixture rather than carbon monoxide or hydrogen alone. Contrary to the conversion in the presence of an oil medium in which positive pressures are used, ordinary atmospheric pressure is preferable and in fact higher pressures are detrimental to the conversion reaction. Rates of gas flow in the reactor down to about 50 Ncbm for each cbm contact volume are useful. By reason, however, of the shortened reaction period required for conversion and the relatively high activity of the catalyst, it is desirable to treat the dry catalyst material to be converted with a gas mixture at a rate of flow preferably in excess of 600 liters per liter contact material per hour of flow at temperatures between 230 and 500° C. and in the case of oxidic iron catalysts preferably between 300 and 350° C. and at normal atmospheric pressure or even reduced pressure. In some cases slightly increased pressure may be used. Pressures, however, of the order of magnitude prescribed for the oil contact conversion method above described, are to be avoided. It is further possible to conduct this type of dry catalyst material conversion with the recycling of tail gases or at least a portion thereof in volume proportion of one part fresh gas for each one to thirty parts of tail gas with or without removal of carbon dioxide in the gas mixture. After the conversion, the activated catalyst material obtained in this manner is then ground with oil or otherwise dispersed in the same and is then ready for use in accordance with the invention. When using the dry material conversion method, the catalyst material of the oxidic type need not necessarily be present in finely subdivided form. It is possible to obtain the conversion with materials present in relatively large pieces. In fact, it is practically easier in many cases to grind or otherwise subdivide the reduced oxidic catalyst material as compared with the non-reduced oxidic material. It is furthermore possible in accordance with conventional and well-known practice to obtain oxidic catalyst material such as oxidic iron catalyst material by suitable precipitation in the form of very fine powder up to a finely granular material without the necessity of grinding larger particled pieces. In this case, the reduced or activated catalytic material is obtained in dry form in sufficiently subdivided particles to be relatively easily dispersed in the oil in accordance with the invention.

It is a well-known phenomenon that carbon monoxide hydrogenation synthesis requires progressively increasing temperatures commensurate with the progressive exhaustion of the catalyst in substantially continuous operations. Ordinarily these increased temperatures are necessary for increased reactivity or rather to make up lost reactivity of the catalyst due to its partial exhaustion. On the other hand, the increased temperatures give rise to the formation of undesirable by-products. When proceeding in accordance with our invention, however, the increased temperatures do not give rise to such formation of undesirable by-products. It is thus possible to gradually raise the temperature within the reactor and still not materially interfere with the synthesis or its yields and actually to compensate thereby for any losses that a partially exhausted catalyst may entail. It is thus possible in accordance with the invention to substantially maintain the beneficial results and yields even after a considerable time of operation and even though a portion of the catalyst may be exhausted. On the other hand, the possibility of raising the temperature without interfering with the reaction mechanism or equilibrium in favor of undesirable by-products permits the maintaining of a temperature range about 10–50° C. in excess of that at which the synthesis was commenced and at which conversion of oxidic catalyst materials can be successfully effectuated. It is in this manner possible to add, once the temperature of synthesis is at the desired level at which oxidic catalyst material can be converted to activated catalyst, in a continuous or periodic operation, finely divided catalyst material in its oxidic form and preferably such catalyst material already suspended in an oil of the type within the reactor at the time of the addition of the catalyst suspension. Such addition should be preferably made from the gas entry side of the reactor and may be either continuously or periodically effected with a corresponding continuous or periodic removal of used catalyst suspension from the gas exit side of the reactor. In this manner, a substantially continuous synthesis operation is possible substantially unlimited in time, and constancy in output can be achieved. Instead non-activated, i. e., oxidic catalyst material, activated or spent and regenerated catalyst material may be used.

When proceeding in accordance with our invention in its application to a reactor in which a predetermined alkali or range of alkali content is to be maintained, and utilizing in the preferred embodiment of the invention substantially continuous operations including the continuous addition or periodic addition of catalyst material with commensurate removal of spent suspension, it is desirable for best results to substantially maintain the alkali content constant within the reactor. This may be accomplished by adding to the catalyst material to be freshly introduced or adding together with such material a somewhat higher alkali content than is ordinarily contained in the catalyst material within the reactor at that time. This will make up for the loss in alkali which occurs when removing suspension from the reactor and aids in keeping substantially constant the percentage of hydrocarbons in excess of $C_3$ in the total yield. The predetermined range of alkali content lies between 0.1 and 10% calculated as $K_2O$ in relation to the catalyst metal content of the applied catalyst. Suitable alkali compounds are the oxides, hydroxides, carbonates, hydrocarbonates, phosphates, silicates and borates of sodium and potassium, furthermore their formiates, acetates or the salts of higher organic acids, such as soaps. The quantity of the alkali compounds to be introduced together with fresh catalyst suspension must be so large that at least the loss in alkali is replaced which has occurred by removing suspension from the reactor. If the formation of a larger quantity of higher boiling synthesis products is desired which can be obtained by increasing the alkali content of the catalyst suspension, a correspondingly larger amount of alkali compounds are to be introduced.

Within a further embodiment of the invention, we find it possible to so adjust the conditions that our novel process may be adapted to any particular synthesis mixture whether the same be on the one hand rich in hydrogen or be on the other hand rich in carbon monoxide. When utilizing in the iron contact synthesis a gas mixture rich in hydrogen the water produced in the reaction enters with part of the carbon monoxide into a water gas equilibrium reaction in accordance with the formula $$CO + H_2O \rightleftarrows CO_2 + H_2$$

which results in a partial removal of carbon monoxide from the synthesis gas thus withdrawing the same from the hydrocarbon synthesis and causing in this manner lower yields of synthesis products. We have discovered that it is possible within the conditions critical for our invention as hereinabove outlined to substantially eliminate this disadvantage and to effectuate, even with gases rich in hydrogen, a practically complete utilization of the carbon monoxide with a maximum yield of synthesis products per cubic meter of synthesis gas used. This result is obtained by effecting a reduced gas-catalyst contact period which may be obtained by so adjusting the rate of flow of the synthesis gas through the suspensions that the same remain in individual contact therewith for only a relatively short period of time. The suspension of catalyst, however, is then repetitiously contacted with the synthesis gas whereby each individual contact is at a relatively high velocity or rate of feed through the suspension while the aggregate of the contacts per time unit fall within the general rate of gas flow limitations herein specified in accordance with the invention. Thus for instance gases rich in hydrogen (for example $2H_2:1CO$) are run at a velocity or rate of flow through the suspension up to fifteen times as high as that employed for gases rich in carbon monoxide (for example $1H_2:2CO$). This fifteen times velocity applies to each individual contacting, and the gases, having passed the suspension at that rate of flow, are then recontacted with catalyst suspension for a sufficient number of times within the general aggregate limits of rate of flow in accordance with the invention until substantially all of the carbon monoxide is effectively utilized. This repetitious contacting may be done by either recycling the emerging gases in each case through the same suspension at the higher rate of flow mentioned or by passing these gases into and through successive stages of a multiple stage synthesis unit. When recycling part or all of the tail gases in accordance with this procedure, we have found it of advantage to add a certain amount of fresh synthesis gas to the mixture. Depending upon conditions affecting the conversion ratio $H_2:CO$ such as pressure, temperature, nature of catalyst and rate of fresh gas feed, we have found it of advantage to select the ratio of recycle or tail gas to fresh feed gas about 2 to 5 times as high as the volume ratio $H_2:CO$ in the fresh feed gas.

We have also sometimes found it of advantage to add a suitable additive affecting surface tension of the oil in the catalyst suspension. This additive may be one of the surface tension reducing type or the surface tension increasing type. Suitable surface tension modifying agents useful in accordance with the invention are for instance the fatty acid salts of alkali metals and of aluminium and preferably sodium or aluminum stearate, palmitate or oleate. Also useful in this connection are, for example, pyridene, higher boiling esters preferably those of inorganic acids such as phosphoric acid esters.

When using multiple stage synthesis, the process involves a passage of the catalyst suspension from stage to stage to meet in each stage fresh synthesis gas.

In the process as described in the invention, between 180 and 195 g. of hydrocarbons are formed out of the normal cubic metre of applied $CO+H_2$, the properties of which are variable within a wide margin, depending on operating and catalyst conditions permissible within the scope of the invention. For instance, products can be produced which predominantly consist of $C_3-C_8$ olefines with a considerable percentage of isohydrocarbons, or hydrocarbons predominantly solid at normal temperature both with a high and low degree of branching and both with a high and low olefine content.

In the process according to the invention, carbon dioxide is produced in large quantities as a by-product in the synthesis. It is expedient to re-use the carbon dioxide in the gas generating process in order to reduce the carbon dioxide to carbon monoxide. This improvement is especially of importance for the production of synthesis gases in which the CO content is to exceed the $H_2$ content.

*Example 1*

In a vertical reaction tube, 20 cm. in diameter, with a mantle surface of 700 cm. in height which can be cooled and heated, 10–15 Ncbm per hour of a gas of the composition $3CO:2H_2$ are passed through a suspension of a catalyst containing 10 kg. of iron, 40 g. of Cu and 100 g. of $K_2CO_3$ with a particle size of 0.05 mm., in 90 kg. of synthesis oil of the 300–320° C. distillation range, for 20 hours, at 280° C. and under a gas pressure of 12 atmospheres in excess of atmospheric pressure.

Towards the end of this period, a vivid synthesis of hydrocarbons sets in. While the use of synthesis gas of similar composition is continued, conditions are adapted to synthesis operation by reducing temperature to 285° C., increasing gas pressure to 25 atm. in excess of atmospheric pressure and raising gas throughput to 25 Ncbm of fresh gas per hour. The catalyst-oil suspension will then form, together with the gas bubbles rising at a comparatively slow rate, a stable three-phase system, the volume of which is about 60% higher than that of the suspension without any passage of gas. Under these conditions, 96–79% of the carbon monoxide are converted. 183 g. of synthesis products are formed out of the normal cubic metre of applied carbon monoxide and hydrogen.

Synthesis products include:

| | Percentage by weight |
|---|---|
| Methane+ethane | 3 |
| $C_3+C_4$ hydrocarbons (liquid gas) | 21 |
| Liquid hydrocarbons up to 180° C | 55 |
| Liquid hydrocarbons 180–320° C | 17 |
| Paraffin above 320° C | 4 |

The anti-knock quality of the 20° C.–150° C. fraction is 72 octane numbers (motor method).

80% of the liquid gas hydrocarbons are unsaturated. The olefine content of the liquid products amounts to 78–82%, the alcohol content being 2%.

If, on the other hand, considerably less than 10 Ncbm of synthesis gas are applied instead of 25 Ncbm per hour, with the other operating conditions remaining unchanged, the three-phase system of catalyst-oil-gas breaks down, being reduced to the two-phase system of catalyst-oil the volume of which is only a few percent higher than without any passage of gas. Together with the decrease in volume, the conversion of carbon monoxide drops below 70% while at the same time the percentage of $C_1+C_2$ hydrocarbons in the total products rises to 7%.

Example 2

Ferric oxide produced by precipitation from nitrate of iron (III) with subsequent washing and rapid drying, containing 0.5% of copper and 0.8% of $K_2CO_3$, is crushed to a particle size of less than 0.05 mm. in the presence of the threefold weight quantity of synthesis oil. This catalyst-oil suspension is mixed in a tall reaction cylinder at 280° C. with such a quantity of synthesis oil of the 300–340° C. distillation range as to produce a suspension containing 20% by weight of iron. At the temperature of 280° C. this suspension is treated for 16 hours with 100–200 Ncbm of carbon monoxide per hour per cbm of suspension volume under a pressure of 3 atmospheres. After this activation, 300 normal cubic metres per hour of synthesis gas containing 38% of carbon monoxide and 50% of hydrogen are passed through 1 cbm of suspension at an initial temperature of 250° C. while the gas is kept under a pressure of 20 atmospheres. Part of the exit gas is, without expansion and after removal of the reaction products which are voluntarily separated at 30–50° C., again passed through the reactor together with fresh synthesis gas at the ratio of 3 volumes of recycle gas per volume of fresh feed gas. 92% of the carbon monoxide and 87% of the hydrogen are converted. One normal cubic metre of applied $CO+H_2$ will yield 172 g. of products of the following composition: 6% of $C_1-C_2$ hydrocarbons; 74% of liquid gas and gasoline hydrocarbons with a distillation end point of 200° C.; and 17% of hydrocarbons boiling above 200° C. The gasoline and liquid gas hydrocarbons contain between 76 and 84% of olefines.

In order to maintain an average gas throughput of at least 90%, the catalyst is, beginning from about 500 hours of operation, gradually removed from the reactor and replaced by corresponding quantities of fresh or regenerated catalyst at such a rate that the average stay of the catalyst in the reactor is about 900 hours. The exchange of the fluid medium proceeds at about the same rate as that of the catalyst. The catalyst removed from the reactor is separated from oil and can be re-used in the synthesis after simple regeneration, e. g., by extraction.

The decrease in alkali content in the reactor which will occur due to the removal of part of the suspension is made up for by providing for the catalyst to be freshly introduced an alkali content which is correspondingly higher.

Example 3

Active ferric oxide nearly roentgen-amorphous is produced by precipitation from a solution of nitrate of iron (III), containing 5–10% of Fe, with soda, soda lye or ammonia with subsequent thorough washing and rapid drying. If the natural Cu content should be lower, such a quantity of nitrate of copper is added to the catalyst prior to the precipitation as to obtain a final Cu content of about 0.5–1% of the iron. Before drying, 0.5% by weight of $K_2CO_3$ (in relation to Fe) are added to the ferric oxide. The dry catalyst is mixed with synthesis oil of the 290–330° C. distillation range at the weight ratio of 1:3 and crushed to a particle size of less than 0.01 mm.

This concentrated catalyst-oil suspension is mixed in a reaction cylinder of 12 metres height with synthetic oil preheated to 280° C. of the 240–330° C. distillation range at a ratio to obtain a suspension containing about 10% of Fe.

Under a pressure of 10–15 atm. in excess of atmosphere pressure, this suspension is treated without delay per hour with 150 Ncbm of synthesis gas per cubic metre of catalyst-oil volume at 270–275° C. The synthesis gas contains about 35% of CO and 55% of $H_2$, the rest consisting of $CO_2$ and $N_2$. At the end of 5–10 hours, as soon as 96–98% of the CO are consumed, the temperature is reduced to 255° C. within about 5 hours, the throughput per hour of synthesis gas is increased to 220 Ncbm per cubic metre of reactor, and part of the exit gas, mixed with the fresh synthesis gas, is passed again over the catalyst at the ratio of 3.5 volumes of recycle gas per volume of fresh feed gas, without previous expansion. Before re-introducing the exit gas into the synthesis process, the gas is freed from the synthesis hydrocarbons carried with it and deposited at normal temperature, and from the synthesis water.

The average service life of the catalyst until the drop in output to 90% of the initial value is 800–1200 hours approximately. Within this period, the catalyst is gradually replaced by fresh or regenerated catalyst without any interruption in operations, which will maintain the output of the synthesis apparatus on a constant level. The average synthesis temperature is 275° C.

The following results are obtained:

Hydrocarbons: 174 g. per Ncbm of applied $CO+H_2$

Composition:
$C_1+C_2$, 3.5%
$C_3+C_4$, 16%, olefine content 74%
$C_5-C_9$, 61%, olefine content 77%
$C_{10}+$ higher, 19.5%

In addition 2.7% of water-soluble alcohols are produced.

300–350 tons of $C_3$ and higher hydrocarbons are produced per ton of Fe. One cubic metre of reactor will yield 800 kg. of $C_3$ and higher hydrocarbons in 24 hours.

Through the use of a catalyst alkalized with 1–3% of $K_2CO_3$ while the high molecular paraffin hydrocarbons accumulating in the reactor are quickly removed, e. g., by filtration of part of the suspension to be carried out continuously or at brief intervals, a synthesis product is formed which predominantly consists of hydrocarbons solid at normal temperature with a yield of 170–178 g. of Ncbm. 70% of this product have a distillation end point above 320° C., while the $C_1+C_2$ hydrocarbons drop below 2%.

The yield of the high molecular hydrocarbons boiling above 320° C. can be increased to 150 g. per Ncbm of $CO+H_2$ and more by the continuous feeding into the reactor of corresponding quantities of lower molecular hydrocarbons boiling below 320° C., these hydrocarbons being subject to molecular enlargement during synthesis. For this purpose, paraffin hydrocarbons can be used as well as olefines.

Example 4

Ferriginous residue from the conventional alkaline disintegration of bauxite, containing about 60% of $Fe_2O_3$, is freed from the main quantity of its $Na_2CO_3+NaOH$ content amounting to about 5–6% by washing with little water in the heat, and mixed with about 2% by weight of $K_2CO_3$ in relation to the Fe content. After drying, the catalyst is crushed in the presence of oil. Operation can be started with CO at about 2 atm. in excess of atmospheric pressure or with synthesis gas containing CO and $H_2$ at 10 atm. in excess of atmospheric pressure, as has been described in Examples 2 and 3.

In a suspension of the catalyst in synthetically produced hydrocarbon oil of the 290–330° C. distillation range containing 50 g. of Fe per litre, 140 Ncbm of synthesis gas are converted per hour per cubic metre of fluid medium under the following conditions: Gas pressure 15 atm. in excess of atmospheric pressure, temperature 255–310° C. synthesis gas containing 54% of CO and 35% of $H_2$, one single passage of gas. At a CO conversion of initially 96%, finally 88%, one Ncbm of applied $CO+H_2$ will yield, on the average, the following products:

Total hydrocarbons: 182 g.
 including $C_1+C_2$ hydrocarbons_____ 16 g.
 liquid gas $C_3+C_4$_____ 31 g. with 85% olefines.
 gasoline (15–200° C.)_____ 95 g. with 83% olefines.
 gas oil (200–320° C.)_____ 28 g. with 76% olefines.
 hydrocarbons above 320° C._ 7 g.
 water-soluble alcohols_____ 5 g.

Without regeneration, catalyst life is 600–700 service hours which is equal to an output of 250–280 tons of products ($C_3$ hydrocarbons and higher hydrocarbons up to and including solid paraffins) per ton of iron contained in the catalyst.

Example 5

A catalyst produced by rapid thermic decomposition of ferric nitrate which contains 0.5% of copper and 0.6% $K_2O$ in relation to the iron content is ground in a ballmill with the threefold quantity-in-weight of a hydrocarbon oil produced during the synthesis and having the boiling range of 280–320° C. and is introduced into a reactor preheated to 280° in which there is already a like amount in weight of the same synthesis oil. The whole suspension contains approximately 20–22 per cent by weight of iron. A quantity of sodium stearate equal to 2 per cent by weight of the iron content is added to this suspension. Instead of sodium stearate, other salts of fatty acids of the alkali metals or of the aluminium, pyridine or organic esters of phosphoric acid may be used, generally in amounts between 0.1 and 4% by weight of iron in the catalyst.

From the bottom of the reaction chamber, synthesis gas (i. e. fresh gas) with a content of approximately 38 per cent by volume of hydrogen and 55 per cent by volume of carbon monoxide is led through the suspension in a state of fine distribution under a pressure of 20 atmospheres with a space velocity of 400 (i. e. 400 normal cubic metres of synthesis gas per cubic metre of suspension per hour). After 2–3 hours 96–98% of the carbon monoxide is converted. Thereupon, the synthesis temperature is lowered within 24 hours from 280° C. to 260 till 265° C. Within 400 working hours an average of 93 per cent of the carbon monoxide are converted and within 700 hours an average of 90% CO are converted. Each normal cubic meter of the applied synthesis gas yields in the beginning an average of 182 grs., and over the whole working-time an average of 174 grs. of hydrocarbon products with more than two carbon atoms in the molecule are formed with a content of oxygen-containing organic compounds of about 4 per cent. The synthesis products consist of 65 per cent of the hydrocarbon fraction 20–150° C., to 17 per cent of higher boiling hydrocarbon oils and to 16 per cent of $C_3$- and $C_4$-hydrocarbons (i. e. hydrocarbons with 3 and 4 carbon atoms in the molecule). The proportion of the olefines on the entire synthesis products amounts to nearly 82 per cent.

In the course of 700 working-hours, the synthesis temperature is gradually increased up to 295° C. During the whole working-time, nearly 2000 kgs. of synthesis products are produced by 1 kg. of iron contained in the catalyst. The average output of hydrocarbons with three and more carbon atoms in the molecule amounts to 1530 kgs. daily per cubic meter of catalyst suspension.

Similar results are obtained by employing other suitable catalysts conventionally employed for carbon monoxide hydrogenation, for instance nickel, cobalt or ruthenium catalysts, the preparation and activating methods of which are principally the same as the cited methods for the preparation and activation of oxidic iron catalysts.

The foregoing description is furnished by way of illustration and not of limitation, and it is therefore our intention that the invention be limited only by the appended claims or their equivalents wherein we have endeavored to claim broadly all inherent novelty.

We claim:

1. In the synthesis of hydrocarbon products by carbon monoxide hydrogenation, the improvement which comprises continuously passing a synthesis gas into a hydrocarbon oil product suspension of a carbon monoxide hydrogenation catalyst having a concentration in the order of magnitude of from 50–500 g. catalyst base metal per liter suspension and a catalyst particle size of from .002–1.0 mm., at a rate of gas flow expressed in N liters per hour per liter of catalyst suspension, equivalent to about 10–30 times the per cent weight of catalyst base metal in said suspension, maintaining said suspension under a pressure between 3–150 atmospheres above atmospheric adapted to maintain the rate of flow per hour of synthesis feed gas under pressure within the suspension substantially at a value of an order of magnitude of from 5–100 liters per liter of catalyst suspension, to thereby substantially obtain and maintain a mixture of synthesis gas and catalyst suspension having a substantially constant volume of about 40–100% higher than the volume of the suspension itself.

2. Improvement according to claim 1 in which said hydrocarbon oil product corresponds in general composition to a synthesis oil having a distillation range substantially between 250 and 360° C.

3. Improvement according to claim 1 in which there is added to said suspension a surface tension modifying agent for said hydrocarbon oil product.

4. Improvement according to claim 1 in which the carbon dioxide produced as a by-product in the synthesis is re-used in a gas generating process to produce a synthesis gas rich in carbon monoxide for the synthesis.

5. Improvement according to claim 1 in which at least a portion of spent catalyst is substantially constantly replaced during synthesis by active catalyst.

6. Improvement according to claim 5 in which said suspension within said reactor possesses a predetermined alkali content, and in which said alkali content is maintained substantially constant by adding together with said replacing catalyst material a catalyst based percentage of alkali material higher than that of said predetermined alkali content.

7. Improvement according to claim 1 in which said catalyst suspension is initially prepared by reaching a dispersion of a particled CO reducible catalyst material being at least one oxidic compound of a metal of the 8th group of the periodic system of the elements in a hydrocarbon oil product with a gas at least the major part of which consists of carbon monoxide, maintaining the dispersion at a temperature about 10–50° C. higher than synthesis temperature for CO conversion in the presence of such catalyst material, a pressure of 1–10 atmospheres in excess of atmospheric, maintaining a rate of gas flow through said dispersion in excess of 100 liters of said gas per hour per liter of suspension.

8. Improvement according to claim 1, in which at least a portion of said catalyst suspension is prepared by reacting a dispersion in a hydrocarbon oil product of a particled CO reducible catalyst material being at least one oxidic compound of a metal suitable as catalyst for the hydrogenation of carbon monoxide with said synthesis gas during said continuous passing thereof.

9. Improvement according to claim 8 in which at least a portion of spent catalyst is substantially constantly replaced during synthesis by corresponding amounts of said oxidic compound.

10. Improvement according to claim 9 in which said suspension within said reactor possesses a predetermined alkali content, and in which said alkali content is maintained substantially constant by adding together with said replacing oxidic compound a catalyst based percentage of alkali material higher than that of said predetermined alkali content.

11. Improvement according to claim 1 in which said synthesis gas contains a larger proportion of hydrogen than of carbon monoxide, in which the gas is repetitiously passed through such catalyst suspension with each individual passage at a velocity of flow per liter suspension up to 15 times greater than said rate of gas flow, and in which the aggregrate of the contacts per time unit of said repetitious passages fall within the stated limits of said gas flow.

12. Improvement according to claim 11 in which the gas is repetitiously passed through such suspension by repetitiously cycling the same.

13. Improvement according to claim 11 in which the gas is repetitiously passed through such suspension by passing the same through the stages of a multiple stage synthesis unit.

14. Improvement according to claim 13 in which the gas is repetitiously passed through such suspension by repetitiously recycling part of the tail gases through a stage of a multiple stage synthesis unit.

15. Improvement according to claim 11 in which the gas is repetitiously passed through such suspension by repetitiously recycling part of the tail gases through such suspension.

16. Improvement according to claim 15 in which recycled tail gas is mixed for each passage with fresh synthesis feed gas using a ratio of recycle or tail gas to fresh feed gas about 2–5 times as high as the volume ratio of $H_2$:$CO$ in the fresh feed gas.

HERBERT KÖLBEL.
PAUL ACKERMANN.

References Cited in the file of this patent
UNITED STATES PATENTS

| Number | Name | Date |
|---|---|---|
| 2,234,941 | Keith, Jr. | Mar. 11, 1941 |
| 2,361,997 | Dreyfus | Nov. 7, 1944 |
| 2,433,072 | Stewart et al. | Dec. 23, 1947 |
| 2,438,029 | Atwell | Mar. 16, 1948 |
| 2,479,439 | Voorhies, Jr. | Aug. 16, 1949 |
| 2,483,771 | Holder | Oct. 4, 1949 |
| 2,488,530 | Friedman | Nov. 22, 1949 |